PROCESS FOR TREATING PENTACHLOROPHENOL

Robert Dean Cooper, Goddard, Kans., assignor to Frontier Chemical Company, Division of Vulcan Materials Company, Wichita, Kans., a corporation of New Jersey
No Drawing. Filed Nov. 22, 1963, Ser. No. 325,751
3 Claims. (Cl. 260—623)

This invention relates to a process for producing dust-free phentachlorophenol.

Pentachlorophenol is made by the catalytic chlorination of phenol with elemental chlorine in the presence of a catalyst such as anhydrous aluminum chloride, antimony trichloride, iodine, ferric chloride, etc. The material has wide use as an agricultural chemical as a fungicide, bactericide, algicide and herbicide. It is generally sold in the form of prills, flakes or pellets. The dust of the compound is toxic and highly irritating. The technical grade of pentachlorophenol which is used for the above purposes contains minor proportions of the order of 2% to 5% by weight, of tetrachlorophenol and possibly other chlorination products which appear to contribute in some fashion to the production of dust during storage periods which may range from a few days to several months. The dust is not present in the product coming from the manufacturing operation but forms on the surface of the pentachlorophenol particles during storage. This is referred to in the industry as blooming. Very fine crystals form on the surface of the product until, in extreme cases, they look as though they were covered with cotton. These minute crystals are richer in tetrachlorophenol than are the particles as originally produced. The fine crystals grow more heavily in spots throughout the mass until they often resemble cotton balls.

The pentachlorophenol now marketed by various producers contains tetrachlorophenol from amounts ranging from 2.5% to 8% by weight. While it is thought that the tetrachlorophenol content influences the tendency of the product to bloom, this does not appear to be the whole story. The method of producing dust-free pentachlorophenol as hereinafter described does result in a reduction in the tetrachlorophenol content of the product but it by no means eliminates the tetrachlorophenol and in some instances the reduction in the proportion of the impurity would seem to be too small to account for the improvement in the properties of the stabilized product.

It is an object of this invention to provide a process for producing pentachlorophenol in a physical form such that little or no dusting occurs even on extended storage. Another object of this invention is to provide a process for producing pentachlorophenol in a physical form which is exceptionally free-flowing and is rapidly soluble in oil or other vehicles in which the material is used.

In one specific embodiment this invention comprises a process in which technical quality solid pentachlorophenol is subjected to contact with a stream of hot air while moving the particles in such a manner as to insure good contact with the air and to prevent agglomeration.

If hot air is passed through a static bed of the crude pentachlorophenol, it tends to agglomerate the particles so that they are no longer free flowing. I have found that tumbling the particles, for example, in a rotating cylinder while passing the hot air through the bed results in a reduction in the tetrachlorophenol content to a point such that there is virtually no tendency to bloom or dust. The tetrachlorophenol content is materially reduced but there is substantially no loss in the pentachlorophenol content.

Moreover it was discovered that the physical appearance of the product was greatly improved by this hot air treatment in a rotating cylinder which is preferably provided with a series of radial flights or liters whereby the particles are lifted and caused to fall down through the air passing through the cylinder. When flakes, for example, are treated in this way, the edges of the flakes become rounded and the particles have a smooth, polished appearance. The improved physical appearance is in no way due to attrition since free dust is not found in the cylinder or in the treating air leaving the cylinder. The particles are even more free-flowing than when originally manufactured and are quickly soluble in oil or other solvent vehicle. It was found that they do not develop bloom or dust, at least to any objectionable amount. In some instances if the treatment is not sufficiently complete there may ultimately be a development of dust on the particle surface which is detectable upon examination with a microscope. It is evident that a crystalline change has occurred during the treatment. The final product has a smooth, glossy, slick surface entirely different from the appearance of the original untreated product, even prior to the time that the bloom has begun to develop.

It has also been discovered that a product which has developed bloom may be subjected to this treatment with the result that the bloom or dust is removed or destroyed and the remaining solid pentachlorophenol has little or no tendency to again develop bloom or dust upon further storage over long periods of time.

As previously mentioned the agitation of the particles undergoing treatment is preferably carried out in a rotating drum or cylinder equipped with suitable lifting flights, hot air being introduced at one end of the vessel and removed from the other. Any other suitable method of agitating or tumbling the particles during the treatment may be employed.

The heating operation is carried out within the range of about 95° C. to about 135° C. and preferably at a temperature of about 105° C. to about 120° C. This is above the melting point of tetrachlorophenol but well below the melting point of pentachlorophenol. It is far below the boiling point of either of the chlorophenols.

The air is preferably heated before being introduced into the contacting zone, this being the most convenient method of furnishing the heat requested for the anti-dusting treatment. The air is passed in at a rate of about 0.04 to about 0.25 cubic feet per minute per pound of crude pentachlorophenol. The treatment may last from about one to about 20 hours, preferably being carried out at about 1.5 to about five hours. Additional heating time does no harm but may produce no added benefit. When a rotary drum is used the peripheral turning rate is suitably in the range of about 20 to about 80 feet per minute and is preferably about 30 to about 60 feet per minute.

In the following examples an accelerated dust method was developed for determining the effectiveness for reducing the dust formation rate of various procedures. Clear glass bottles containing the products to be evaluated were placed in an enclosed box with an ultraviolet light source of about 30 watts input located at about ten inches from the samples. The samples were positioned for maximum exposure to the light source. By using this method, blooming or dust formation is apparent in a small fraction of the time required in regular storage. The method has been found to correlate adequately well with storage of the material so that the value of the treatment can be determined in a comparatively short period of time.

The following examples are given for purposes of illustration and are not intended to be unduly limiting as to the scope of the invention having particular reference to the specific conditions employed therein.

Example I

Flaked pentachlorophenol, 406.1 g. (containing 3.11% tetrachlorophenol) was charged to a metal cylinder 4″ I.D. by 7″ long. The cylinder was equipped with 1″ radial flights, three in number, attached internally to the circumference. Pipe (¼″) was attached at each end of the cylinder and provided a means for rotation of the cylinder and passage of air into and out of the cylinder. The cylinder was rotated within a small oven with the two pipe ends extending through the oven. The temperature of the oven was controlled at 115° C. ±2° C. The rotation rate was 30 r.p.m. and air was passed through the rotating, heated cylinder and over the surface of the flaked pentachlorophenol at 2 SCFH. At the end of the two-hour treatment, the heat was turned off and the oven door opened for rapid cooling. Rotation was continued during the cooling period. The cooled cylinder was opened and the recovered product weighed. It had a glossy surface with rounded corners and by analysis contained 2.00 percent by weight of tetrachlorophenol. After 60 days' exposure in the ultraviolet accelerated blooming test, it showed a very light bloom, visible only under a microscope.

In Table I appears a summary of a number of runs which were made using prills, flakes and pellets. These were conducted in the apparatus and under substantially the same conditions as illustrated in Example I but with some variations in temperature, rate of airflow and contact time. The tetrachlorophenol content was determined before and after treatment.

It will be noted from comparing runs 12 and 13 that while the first two-hour treatment at 115° C. resulted in a reduction of tetrachlorophenol content from 3.11% to 2%, a further two-hour treatment under the same conditions resulted in a further reduction of less than 0.10% in the tetrachlorophenol content. This leads me to believe that the offending material which causes the formation of bloom or dust may not be tetrachlorophenol but may be some other unknown impurity which is responsible for the offensive condition either alone or when present in conjunction with tetrachlorophenol.

Runs 12, 14 and 15 also indicate that a material which has already formed heavy dust deposits before treatment can be rendered stable to storage by the method herein described.

I claim:

1. A process for treating crude pentachlorophenol which tends to bloom or dust during storage which comprises: introducing solid particles of crude pentachlorophenol into a treating zone maintained at a temperature above the melting point of tetrachlorophenol but below the melting point of pentachlorophenol, introducing a hot gas into said zone at a temperature in the range of about 95° to about 135° C. at a rate of about 0.04 to about 0.25 cubic feet per minute per pound of pentachlorophenol, the residence time in said zone being at least about one hour and sufficient to effect a substantial reduction in the tetrachlorophenol content of the material undergoing treatment.

TABLE I.—HOT AIR TREATMENT OF PENTACHLOROPHENOL FOR PREVENTION OF DUST FORMATION

| Run No. | Identity of Penta | Treatment Variables | | | Tetrachlorophenol Content, Weight Percent | | Accelerated Test Time, Days, Before Appearance of "Bloom" Dust | |
|---|---|---|---|---|---|---|---|---|
| | | Air Flow, S.c.f.h. | Temperature, °C. | Time, Hours | Before Treatment | After Treatment | Before Treatment | After Treatment |
| 3 | #27 prills | 2 | 95 | 8 | 3.20 | 2.45 | 6 | None after 21. |
| 4 | do | 2 | 95 | 16 | 3.20 | 2.02 | 6 | None after 150. |
| 5 | do | 2 | 105 | 4.5 | 3.20 | 2.09 | 6 | Do. |
| 6 | do | 2 | 105 | 6 | 3.20 | 1.96 | 6 | Do. |
| 7 | do | 2 | 115 | 1.75 | 3.20 | 2.08 | 6 | Do. |
| 8 | #29 prills | 1 | 115 | 2 | 3.58 | 3.30 | 2 | 2. |
| 9 | do | 2 | 115 | 2 | 3.58 | 2.22 | 2 | Very light after 150. |
| 11 | #9 flake | (¹) | 115 | 2 | 3.74 | 3.03 | Unknown | 2. |
| 12 | Flake | 2 | 115 | 2 | 3.11 | 2.00 | Unknown | Very light after 60. |
| 13 | do.² | 2 | 115 | 2 | 2.00 | 1.91 | | |
| 14 | do | 2 | 115 | 4 | 3.11 | 2.45 | ³ Unknown | Do. |
| 15 | do | 5 | 130 | 2 | 3.11 | 2.49 | ³ Unknown | Do. |
| 16 | Pellets ⁴ | 2 | 115 | 2 | 3.11 | 2.00 | 2 | None after 55. |

¹ Steam, no air.
² Pentachlorophenol charged in Run 13 was recovered material from Run 12.
³ Pentachlorophenol had already formed heavy dust before treatment.
⁴ ¼″ pellets formed from flake material by grinding and pelleting.

It will be noted from these examples that there was some reduction in tetrachlorophenol content during the treatment, this being very generally of the order of 30% but the improvement in dusting characteristics in the accelerated test was extraordinary and is probably not directly related to the tetrachlorophenol content of the material before and after the treatment. Thus, in a sample which originally contained about 3.2% of tetrachlorophenol and which developed bloom within six days, developed no bloom after 150 days of the accelerated storage test although the tetrachlorophenol content was reduced only to about 2%. In one sample a reduction from 3.2 to 2.45% resulted in a treated product which had not developed dust after 21 days of exposure, the test being terminated at this point.

2. The process of claim 1 wherein the contacting is effected in a rotating drum having a peripheral turn rate of about 20 to about 80 feet per minute.

3. The process of claim 1 wherein the time of contact is from about 1 to about 20 hours.

References Cited

UNITED STATES PATENTS 3,234,307  2/1966  Tuttle _____ 260—623

LEON ZITVER, *Primary Examiner.*

BERNARD HELFIN, *Examiner.*

WERREN B. LONE, *Assistant Examiner.*